(12) United States Patent
Sadakane et al.

(10) Patent No.: US 10,583,634 B2
(45) Date of Patent: Mar. 10, 2020

(54) LAMINATED SUBSTRATE FOR WINDOW, LAMINATED SUBSTRATE FOR WINDOW WITH FRAME BODY, AUTOMOBILE WITH LAMINATED SUBSTRATE FOR WINDOW, AND INTERMEDIATE LAYER STRUCTURE FOR LAMINATED SUBSTRATE FOR WINDOW

(71) Applicant: AGC Inc., Chiyoda-ku (JP)

(72) Inventors: Shunsuke Sadakane, Chiyoda-ku (JP); Jirou Nishihama, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 335 days.

(21) Appl. No.: 15/245,729

(22) Filed: Aug. 24, 2016

(65) Prior Publication Data

US 2016/0361898 A1 Dec. 15, 2016

Related U.S. Application Data

(63) Continuation of application No. PCT/JP2015/056356, filed on Mar. 4, 2015.

(30) Foreign Application Priority Data

Mar. 10, 2014 (JP) .................................. 2014-045896

(51) Int. Cl.
*B32B 17/10* (2006.01)
*B60J 1/00* (2006.01)
(Continued)

(52) U.S. Cl.
CPC ........ *B32B 17/10293* (2013.01); *B32B 5/142* (2013.01); *B32B 7/02* (2013.01);
(Continued)

(58) Field of Classification Search
CPC .......... B32B 17/10293; B32B 17/1055; B32B 17/10036; B32B 5/142; B60J 1/02; B60J 1/18; B60J 1/001
See application file for complete search history.

(56) References Cited

U.S. PATENT DOCUMENTS

| | | | |
|---|---|---|---|
| 2008/0008521 A1* | 1/2008 | Naik | F16B 5/01 403/255 |
| 2012/0094084 A1* | 4/2012 | Fisher | B32B 17/10036 428/174 |

(Continued)

FOREIGN PATENT DOCUMENTS

| | | | | |
|---|---|---|---|---|
| FR | 2612174 A1 * | 9/1988 | ............. | B32B 17/10 |
| JP | 2001-64045 | 3/2001 | | |

(Continued)

OTHER PUBLICATIONS

International Search Report dated May 26, 2015 in PCT/JP2015/056356 filed on Mar. 4, 2015 (with English Translation).

(Continued)

*Primary Examiner* — Laura A Auer
(74) *Attorney, Agent, or Firm* — Oblon, McClelland, Maier & Neustadt, L.L.P.

(57) ABSTRACT

Disclosed is a laminated substrate for a window, in which substrates are laminated through an intermediate layer structure, the laminated substrate includes a peripheral edge region, and a central region, wherein the intermediate layer structure includes a first region, and a second region, wherein, when a value obtained by dividing shear modulus of the second region against static force by shear modulus of the first region against the static force is denoted by x, a ratio of an area of the second region with respect to an area of the whole laminated substrate for the window is greater than or equal to (−74.87x+204.47)%, for 1.40≤x≤2.72; and greater (Continued)

than or equal to (−0.0067x+0.87)%, for x>2.72; and wherein a ratio of an area of the second region in the central region is less than or equal to 83%.

15 Claims, 7 Drawing Sheets

(51) Int. Cl.
*B60J 1/02* (2006.01)
*B60J 1/18* (2006.01)
*B32B 7/02* (2019.01)
*B32B 7/12* (2006.01)
*B32B 5/14* (2006.01)
*B32B 27/36* (2006.01)
*B32B 27/08* (2006.01)
*B60J 1/16* (2006.01)
*B60J 1/17* (2006.01)

(52) U.S. Cl.
CPC .......... *B32B 7/12* (2013.01); *B32B 17/10036* (2013.01); *B32B 17/1055* (2013.01); *B32B 27/08* (2013.01); *B32B 27/365* (2013.01); *B60J 1/001* (2013.01); *B60J 1/007* (2013.01); *B60J 1/02* (2013.01); *B60J 1/16* (2013.01); *B60J 1/18* (2013.01); *B32B 2307/54* (2013.01); *B32B 2307/542* (2013.01); *B32B 2307/732* (2013.01); *B32B 2419/00* (2013.01); *B32B 2605/006* (2013.01); *B60J 1/17* (2013.01)

(56) References Cited

U.S. PATENT DOCUMENTS

| 2014/0044941 | A1 | 2/2014 | Shimamoto et al. |
| 2015/0158986 | A1* | 6/2015 | Xu ................. B32B 15/082 428/412 |

FOREIGN PATENT DOCUMENTS

| JP | 2006-327381 | 12/2006 |
| JP | 2008-168708 | 7/2008 |
| WO | WO 2012/141002 A1 | 10/2012 |

OTHER PUBLICATIONS

Written Opinion dated May 26, 2015 in PCT/JP2015/056356 filed on Mar. 4, 2015.

\* cited by examiner

LAMINATED SUBSTRATE FOR WINDOW, LAMINATED SUBSTRATE FOR WINDOW WITH FRAME BODY, AUTOMOBILE WITH LAMINATED SUBSTRATE FOR WINDOW, AND INTERMEDIATE LAYER STRUCTURE FOR LAMINATED SUBSTRATE FOR WINDOW

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2015/056356 filed on Mar. 4, 2015 and designating the U.S., which claims priority of Japanese Patent Application No. 2014-045896 filed on Mar. 10, 2014. The entire contents of the foregoing applications are incorporated herein by reference.

BACKGROUND OF THE INVENTION

1. Field of the Invention

The present invention relates to a laminated substrate for a window; a laminated substrate for a window with a frame body; an automobile with a laminated substrate for a window; and an intermediate layer structure for a laminated substrate for a window.

2. Description of the Related Art

In recent years, as weight of a vehicle has been reduced, it has been considered to use, as a glass plate for a window glass that has been used so far, a thinner and lighter glass plate. However, as a plate thickness of the glass plate is reduced, a problem arises such that a sound insulating property is lowered.

For example, in Patent Document 1 (WO 2012/141002), it has been proposed to use a laminated glass as a glass plate for a window glass, and to use a film with a sound insulating property as an intermediate film (which is also referred to as the "sound insulating intermediate film," hereinafter), so as to solve the problem that the sound insulating property is lowered.

Specifically, by providing a sound insulating intermediate film with small shear modulus between two glass plates, vibration transmitted from one glass plate to the other glass plate can be absorbed; and vibrations of the two glass plates can be caused to interfere with each other by generating a phase shift between the vibrations of the two glass plates. As a result of these, vibration of the laminated glass plate is suppressed, and a sound insulating property is obtained.

However, for the laminated glass for which the sound insulating intermediate film is used, as in Patent Document 1, stiffness is lowered, compared to a glass plate formed of a single plate having a thickness that is the same as that of the laminated glass. For example, when a glass plate that is a single plate having a plate thickness of 5 mm is compared with a laminated glass in which two glass plates, each of which has a plate thickness of 2.5 mm, are combined, the stiffness of the laminated glass is approximately a half of that of the glass plate that is the single plate.

As a cause of lowering the stiffness of the laminated glass relative to that of the glass plate that is the single plate, it can be considered that, since the shear modulus is small not only for dynamic force, such as a sound wave, but also for static force of which the frequency is smaller than that of the sound wave, upon static force being generated in the laminated glass, the two glass plates are individually deformed. Namely, it is preferable that the shear modulus of the intermediate film be small, so that the sufficient sound insulating property is obtained, as described above; however, the sound insulating property and the stiffness are in a trade-off relationship such that, when the shear modulus is small, the stiffness against static force is lowered, so that it is difficult to achieve both of them.

Here, the problem that it is difficult to achieve both the sound insulating property and stiffness can arise not only for the laminated glass, but also for a case of, for example, a laminated body where the two glass plates are replaced with resin plates.

There is a need for a laminated substrate for a window; a laminated substrate for a window with a frame body; an automobile with a laminated substrate for a window; and an intermediate layer structure for a laminated substrate for a window, with which a sufficient sound insulating property is obtained, and sufficient stiffness is obtained.

SUMMARY OF THE INVENTION

According to an aspect of the present invention, there is provided a laminated substrate for a window, a plurality of substrates being laminated through an intermediate layer structure in the laminated substrate, the laminated substrate for the window including, in a plan view, a peripheral edge region along a periphery of the laminated substrate for the window; and a central region positioned inside the peripheral edge region, wherein the intermediate layer structure includes, in the plan view, a first region, and a second region, wherein shear modulus of the second region against static force is greater than or equal to 1.40 times that of the first region, wherein, when a value obtained by dividing the shear modulus of the second region against the static force by shear modulus of the first region against the static force is denoted by x, in the second region, a ratio of an area of the second region with respect to an area of the whole laminated substrate for the window in the plan view is greater than or equal to $(-74.87x+204.47)\%$, for $1.40 \leq x \leq 2.72$; and greater than or equal to $(-0.0067x+0.87)\%$, for $x>2.72$; and wherein, a ratio of an area of the second region included in the central region in the plan view is greater than or equal to 0% and less than or equal to 83%.

According to another aspect of the present invention, there is provided a laminated substrate for a window with a frame body, a plurality of substrates being laminated through an intermediate layer structure in the laminated substrate, wherein, in the laminated substrate for the window, a peripheral edge portion is supported by the frame body, wherein the laminated substrate for the window includes, in a plan view, a peripheral edge region that overlaps the frame body; and a central region other than the peripheral edge region, wherein the intermediate layer structure includes, in the plan view, a first region, and a second region, wherein shear modulus of the second region against static force is greater than or equal to 1.40 times that of the first region, wherein, when a value obtained by dividing the shear modulus of the second region against the static force by the shear modulus of the first region against the static force is denoted by x, in the second region, a ratio of an area of the second region with respect to an area of the whole laminated substrate for the window in the plan view is greater than or equal to $(-74.87x+204.47)\%$, for $1.40 \leq x \leq 2.72$; and greater than or equal to $(-0.0067x+0.87)\%$, for $x>2.72$; and wherein, a ratio of an area of the second region included in the central region in the plan view is greater than or equal to 0% and less than or equal to 83%.

According to yet another aspect of the present invention, there is provided an intermediate layer structure for a laminated substrate for a window, the intermediate layer structure being provided between a plurality of laminated substrates, wherein the intermediate layer structure includes, in a plan view, a central region, a peripheral edge region, a first region, and a second region, wherein the peripheral edge region is provided along a periphery of the intermediate layer structure, wherein the central region is positioned inside the peripheral edge region, wherein, when a value obtained by dividing shear modulus of the second region against static force by shear modulus of the first region against the static force is denoted by x, in the second region, a ratio of an area of the second region with respect to an area of the whole intermediate layer structure in the plan view is greater than or equal to (−74.87x+204.47)%, for 1.40≤x≤2.72; and greater than or equal to (−0.0067x+0.87)%, for x>2.72; and wherein, a ratio of an area of the second region included in the central region in the plan view is greater than or equal to 0% and less than or equal to 83%.

According to an aspect of the present invention, there is provided an automobile including a window substrate for a vehicle opening, wherein the window substrate is formed of the above-described laminated substrate for the window.

According to the present invention, a laminated substrate for a window, a laminated substrate for a window with a frame body, an automobile with a laminated substrate for a window, and an intermediate layer structure for a laminated substrate for a window can be provided, with which a sufficient sound insulating property is obtained, and sufficient stiffness is obtained.

Other objects, features and advantages of the present invention will become more apparent from the following detailed description when read in conjunction with the accompanying drawings.

DESCRIPTION OF THE PREFERRED EMBODIMENTS

Figure 1:
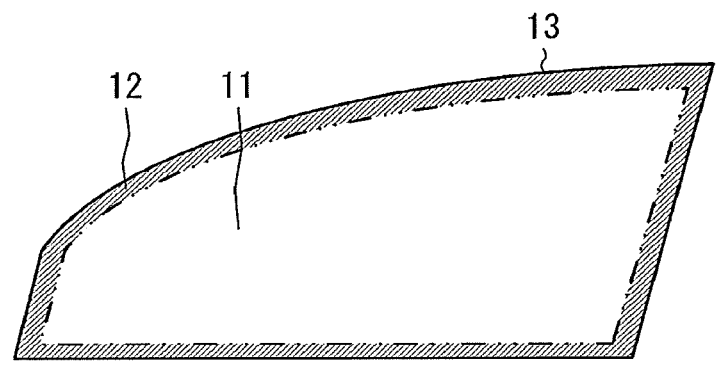
FIG. 1 is a plan view of an intermediate film 13 for a laminated glass according to an embodiment.

A preferred embodiment of a laminated substrate for a window, a laminated substrate for a window with a frame body, an automobile with a laminated substrate for a window, and an intermediate layer structure for a laminated substrate for a window according to the present invention is described below by referring to the drawings.

Here, in the present specification, a laminated glass for a vehicle is described as an example of the laminated substrate for the window; and further a case is described, as an example, where it is a side glass for a vehicle, which is a lifting window that goes up and down in the vertical direction. However, the laminated substrate for the window according to the present invention is not limited to the laminated glass for the vehicle. The laminated substrate for the window may be a structure formed by laminating a plurality of resin substrates, which are formed of a resin material, such as a polycarbonate. Additionally, the laminated substrate for the window according to the present invention can be applied for a windshield for a vehicle, a roof glass for a vehicle, a laminated glass for buildings, and so forth.

Furthermore, in the present specification, an intermediate film for a laminated glass that is formed of a thermoplastic resin is described, as an example of the intermediate layer structure for the laminated substrate for the window. However, the intermediate layer structure according to the present invention is not limited to the intermediate film. In the intermediate layer structure, a first region and a second region may be provided as separated bodies, in such a manner that a first member described below is formed of a thermoplastic resin, and a second member described below includes a high shear modulus body without adhesiveness, and an adhesive layer formed thereon, for example.

Note that, in the drawings for describing the embodiment, for a case where there is no particular description of a direction, it is assumed that the direction refers to the direction on the drawing, and a reference direction in each drawing corresponds to the direction of the the symbol, or the number.

<Intermediate Layer Structure for a Laminated Substrate for a Window Glass>

FIG. 1 is a plan view of an intermediate film for a laminated glass according to an embodiment of the present invention. In the embodiment, the intermediate film 13 for the laminated glass includes, in plan view, a first region 11 and a second region 12.

The first region 11 is provided within a region in a surface of the intermediate film 13 for the laminated glass, which is surrounded by a two-dot chain line. The first region 11 is a region that is formed of a sound insulating intermediate film such that the shear modulus becomes smaller, as sound insulating performance is enhanced. Specifically, for a frequency that is greater than or equal to 2 kHz and less than or equal to 8 kHz, if the shear modulus of the first region 11 is less than or equal to 100 MPa, preferably less than or equal to 75 MPa, and more preferably less than or equal to 50 MPa, when the laminated glass is formed, the vibrations of the glass plates can be absorbed, and the vibrations of the glass plates can be caused to interfere with each other.

Note that, the first region 11 may have any structure, as long as the above-described property of the shear modulus is satisfied. For example, by considering the fact that, if the first region 11 is formed of only one type of a material, the sound insulating property tends not to be high for a broad temperature range, the first region 11 hay have a multi-layer structure such that two or more layers of materials having different properties are laminated in the thickness direction. In the present specification, for simplicity, a case is described where the first region 11 is formed of only one type of a material.

The second region 12 is provided, with a predetermined width, in a region that is surrounded by a solid line, which is an outer peripheral edge of the intermediate film 13 of the laminated glass, and the two-dot chain line, which is at an inner side compared to the solid line. In the embodiment, the second region 12 has a frame shape that is formed over the whole circumference of the intermediate film 13 for the laminated glass; however, the second region 12 is not limited to the shape of this embodiment. The second region 12 may be provided, for example, along a part of an edge of the intermediate film 13 for the laminated glass; and the second region 12 may be provided at both end portions of the intermediate film 13 for the laminated glass. Further, the second region 12 may be provided along one edge of the intermediate film 13 from one end to the other end; and the second region 12 may be provided along two edges of the intermediate film 13 for the laminated glass that face each other. The shape and the arrangement of the second region are described below.

Additionally, the second region 12 has high shear modulus against static force and sound waves, compared to the first region 11. Here, the static force represents, for example, external force with a frequency that is less than or equal to 1 Hz, namely, the loading time is greater than or equal to 1 second (e.g., force that acts on an window glass from an inner side of a vehicle toward an external side of the vehicle, when traveling at high speed while the window glass is half opened). Furthermore, the sound waves represent, for example, sound waves with a frequency that is greater than or equal to 2 kHz and less than or equal to 8 kHz (e.g., sound waves, such as wind noise or vehicle passing sound).

In this manner, by adjusting the shear modulus of the second region 12 against the static force and the sound waves to be higher than the shear modulus of the first region 11, in the second region 12, the two glass plates of the laminated glass can be prevented from being individually deformed, and thereby the stiffness of the laminated glass can be enhanced.

Specifically, if the second region 12 has the shear modulus against static force that is greater than 1.40 times that of the first region 11, preferably greater than or equal to 2.21 times that of the first region 11, the stiffness of the laminated glass can be sufficiently enhanced.

Furthermore, when a value obtained by dividing shear modulus of the second region 12 against static force by shear modulus of the first region 11 against the static force is denoted by x, a ratio of an area of the second region 12 with respect to an area of the whole intermediate film 13 for the laminated glass is preferably greater than or equal to $(-74.87x+204.47)\%$, for $1.40 \leq x \leq 2.72$; and greater than or equal to $(-0.0067x+0.87)\%$, for $x>2.72$, so that the stiffness of the laminated glass can be sufficiently enhanced.

Additionally, when the value obtained by dividing shear modulus of the second region 12 against static force by the shear modulus of the first region 11 against the static force is denoted by x, the ratio of the area of the second region 12 with respect to the area of the whole intermediate film 13 for the laminated glass is more preferably greater than or equal to $(-144.08x+418.31)\%$, for $2.21 \leq x \leq 2.88$; and greater than or equal to $(-0.033x+4.04)\%$, for $x>2.88$.

Note that, for a case where the boundary between the first region 11 and the second region 12 is not clear, as FIG. 1, the portion where the shear modulus against static force is greater than or equal to 1.40 times that of the other portion, or the portion where the shear modulus against the static force is greater than or equal to 2.21 times that of the other portion is defined to be the second region 12.

Additionally, it is preferable that the material of the second region 12 be such that it can be bonded with the first region 11, and that it can be favorably adhered to the two glass plates of the laminated glass. For example, a thermoplastic material that can be easily deformed at a high temperature while having high stiffness at a low temperature, such as ionomer, can be preferably used for the second region 12.

For a case of a material that does not have adhesiveness, such as a glass or a metal, an adhesive may be applied to the second member 12, so that it can be adhered to the two glass plates to be used. By forming the second region 12 by a glass, even for a case where the second region 12 is formed at a central region B, which is described below, visibility of the second region 12 can be suppressed to be low, so that it is preferable for aesthetic purposes. Further, by forming the second region 12 by a metal, for a case where the second region 12 is formed at the central region B, which is described below, a glass with a superior design can be provided, such as a metal fringe.

Further, during installation of the laminated glass at an opening of a vehicle, the second region 12 may be formed by forming a resin molding to be provided at a peripheral edge portion of the laminated glass, so that the resin molding is placed at an inner side of the surface, compared to the outer peripheral edge of the laminated glass.

Specifically, a laminated glass can be produced by using a sound insulating intermediate film having an area that is less than the area of the glass plate, so that the outer peripheral edge of the sound insulating intermediate film is placed at an inner side by a predetermined interval from the outer peripheral edge of the glass plate; and the laminated glass can be shaped, so that the resin molding is placed inside the area, which is from the outer peripheral edge of the glass plate to the outer peripheral edge of the sound insulating intermediate film. At this time, the part of the sound insulating intermediate film can be the first region; and if the resin molding is adhered to the glass plates, in a region within the glass plate in the plan view, the region where the resin molding is formed is the second region.

In this manner, by using the intermediate film 13 for the laminated glass that includes the first region 11 where the shear modulus is low, and the second region 12 where the shear modulus is high, the sound insulating property of the laminated glass can be ensured by the first region 11 where the shear modulus is low, while enhancing the stiffness by the second region 12 where the shear modulus is high.

<The Laminated Substrate for the Window>

Figure 2:
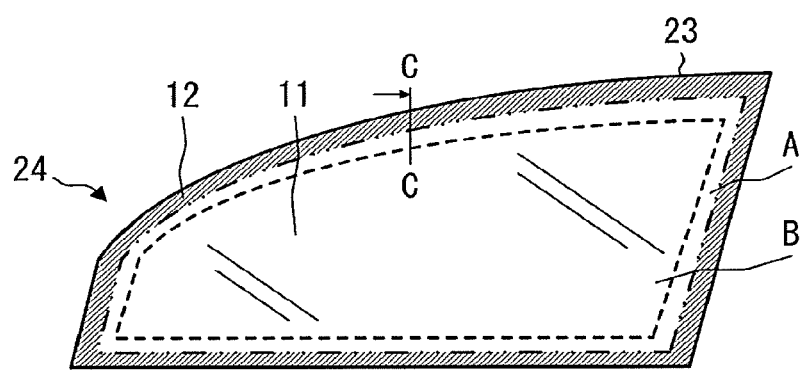
FIG. 2 is a plan view of a laminated glass 24 using the intermediate film 13 for the laminated glass according to the embodiment.

FIG. 2 is a plan view of a laminated glass 24 for which the intermediate film 13 for the laminated glass according to the embodiment of the present invention is used. A plurality of glass plates 23 is laminated through the intermediate film 13 for the laminated glass to form the laminated glass 24.

In FIG. 2, it is assumed that an outline of the plurality of glass plates 23 overlaps in the plan view with an outline of the intermediate film 13 for the laminated glass; and that the first region 11 and the second region 12, which are formed in the intermediate film 13 for the laminated glass, are formed in the laminated glass 24 as they are in the plan view. Thus, in the following, the structures of the first region 11 and the second region 12 are described for a case where the laminated glass 24 is formed; however, it is assumed that the structures are the same for the first region 11 and the second region 12 for the intermediate film 13 for the laminated glass.

In the embodiment, the region of the laminated glass 24 is divided into regions A and B.

In FIG. 2, the region A is a region surrounded by the solid line, which corresponds to the outer peripheral edge of the laminated glass 24, and the dashed line, which is at an inner side compared to the solid line, namely, the region along the outer periphery of the laminated glass 24, which is the region that overlaps with a vehicle body when the laminated glass 24 is attached to the vehicle. Namely, in FIG. 2, the dashed line indicates the edge portion of the vehicle body; and the region A at the outer side compared to the dashed line is a region that may not be visually recognized for a case of a fixed window (the region A is also referred to as the "peripheral edge region A," hereinafter).

In FIG. 2, the region B is a region inside and surrounded by the dashed line; and the region B is an open region of the vehicle body (the region B is also referred to as the "central region B," hereinafter).

In the embodiment, the peripheral edge region A is a region overlapping with the vehicle body; however, it is not limited to such a region. For example, for a case where the laminated glass 24 is used for a windshield for a vehicle, the peripheral edge region A may be a region overlapping with the resin molding; and for a case where the laminated glass 24 is used for a window glass for a building, the peripheral edge region A may be a region overlapping with a window sash. The things that are to be installed at a peripheral edge of the laminated glass 24 to fix the laminated glass 24, such as the car body, the resin molding, and the window sash, are collectively referred to as a "frame body," in the specification.

Further, the central region B is a portion where sound waves from outside the vehicle, such as wind noise or vehicle passing sound, enter inside the vehicle; in contrast, the peripheral edge region A is a portion where such sound waves from outside the vehicle may not pass through.

As illustrated in FIG. 2, for a case where the laminated glass 24 is produced by using the intermediate film 13 for the laminated glass, the second region 12 is preferably placed inside the peripheral edge region A. By arranging the second region 12 in this manner, the central region B, from which sound waves enter inside the vehicle, can be the first region 11 having high sound insulating property, over the entire laminated glass 24. Namely, since the peripheral edge region A is originally a portion where sound waves may not pass through, by providing the second region 12 inside the peripheral edge region A, the stiffness of the laminated glass 24 can be enhanced without lowering the sound insulating property of the laminated glass 24.

Here, in the embodiment, the second region 12 is formed with a predetermined width toward an inner side of the surface from the outer peripheral edge of the laminated glass 24, which is illustrated by the solid line in FIG. 2, over the whole circumference; however, the second region 12 is not limited to such a configuration. For example, in the peripheral edge region A, the second region 12 may be formed, at an inner position separated from the outer peripheral edge of the laminated glass 24, with a predetermined width toward an inner side of the surface.

Additionally, as a modified example of a configuration of the second region 12 for applying to the laminated glass 24, the configuration may be as follows.

Figure 3:
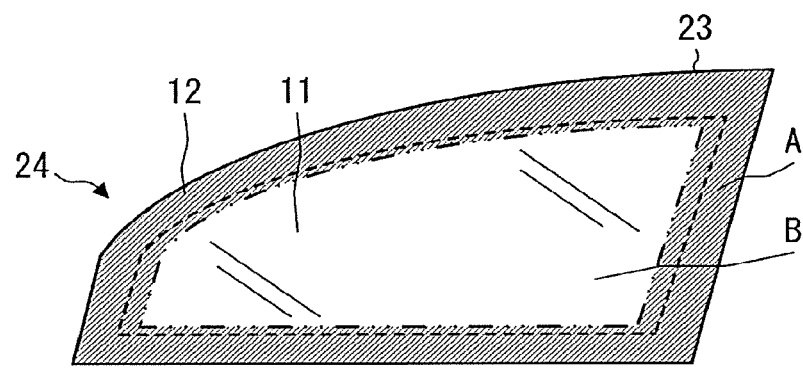
FIG. 3 is a plan view of a first modified example of a structure of a second region 12.

FIG. 3 is a plan view of a first modified example of the configuration of the second region 12, which indicates an example where the second region 12 is formed in the entire region of the peripheral edge region A and in the central region B. In FIG. 3, the second region 12 occupies the entire area of the peripheral edge region A, and a part is formed inside the central region B. In this case, a ratio of the area inside the central region B that is occupied by the second region 12 with respect to the area of the central region B is greater than or equal to 0% and less than or equal to 83%; preferably less than or equal to 50%; and more preferably less than or equal to 31%. If the ratio of the area inside the central region B that is occupied by the second region 12 with respect to the area of the central region B is less than or equal to 83%, in the central region B, a sufficient area of the first region 11 having high sound insulating property can be reserved, so that a sufficient sound insulating property can be obtained. Consequently, sound waves can be suppressed from passing through, compared to a case where the entire area of the central region B is the intermediate film that does not have high sound insulating property (which is referred to as the "normal intermediate film," hereinafter), so that the stiffness can be enhanced while maintaining the desired sound insulating property.

From the point of view of enhancing the stiffness, it is desirable that the second region 12 is formed, in the central region B, at least in the area within 100 mm, preferably within 80 mm, and more preferably within 50 mm, toward an inner side of the surface from the dashed line, which is the edge portion of the vehicle body. That is, in general, the width of the vehicle body that overlaps with the glass plate is approximately 20 mm, so that the second region 12 is formed at least at a region within 120 mm, preferably within 100 mm, and more preferably within 70 mm, from the edge edge portion of the glass plate.

Figure 4:
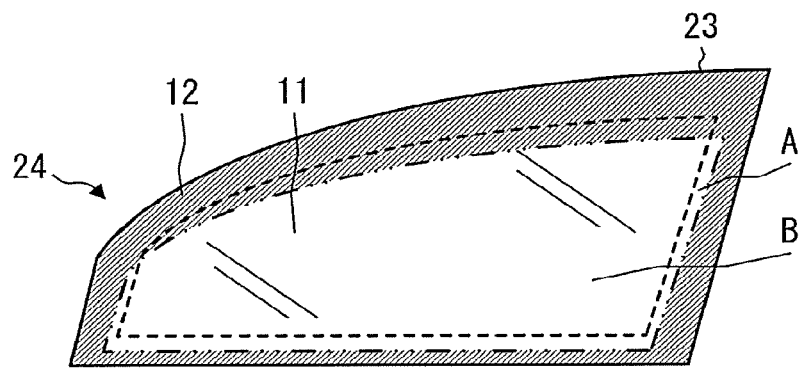
FIG. 4 is a plan view of a second modified example of the structure of the second region 12.

FIG. 4 is a plan view of a second modified example of the configuration of the second region 12, which indicates an example where the second region 12 is formed in the peripheral edge region A and in the central region B. As illustrated in FIG. 4, the second region 12 may be formed within the central region B only in the upper edge of the laminated glass 24. In this manner, even if the second region 12 does not occupy the entire area of the peripheral edge region A, it suffices if only a part of the second region 12 is formed to protrude toward inside the central region B.

Note that, in this case, the ratio of the area inside the central region B that is occupied by the second region 12 with respect to the area of the central region B is also greater than or equal to 0% and less than or equal to 83%; preferably less than or equal to 50%; and more preferably less than or equal to 31%. Additionally, the second region 12 is formed at least in the area within 120 mm, preferably within 100 mm, and more preferably within 70 mm, from the edge portion of the glass plate.

Figure 5:
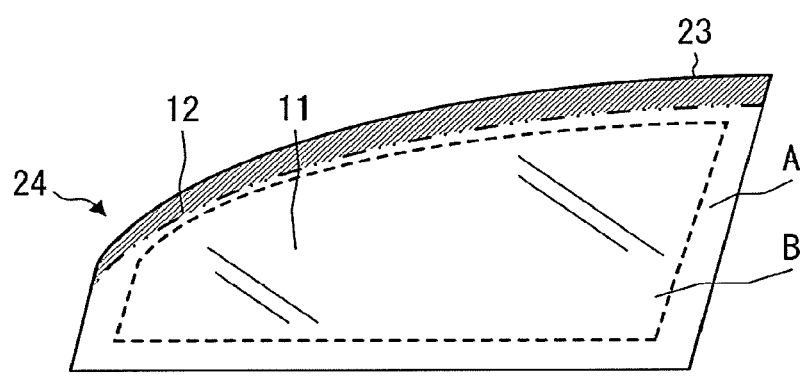
FIG. 5 is a plan view of a third modified example of the structure of the second region 12.

FIG. 5 is a plan view of a third modified example of the configuration of the second region 12, which indicates an example where the second region 12 is formed along one edge of the laminated glass 24. In FIG. 5, the second region 12 exists only at the upper edge of the laminated glass 24. In the embodiment, the laminated glass 24 is a lifting window that goes up and down in the vertical direction; and, upon the laminated glass 24 being moved upward or downward, the upper edge of the laminated glass 24 is not supported by the vehicle body. Such an edge is a portion such that, when external force is applied to the laminated glass 24, especially when traveling at high speed while the window is half opened, and when force is applied that acts on the window glass from inside the vehicle toward outside the vehicle, high shearing stress tends to be generated in the intermediate film 13 for the laminated glass. Thus, by forming the second region 12 along such an edge, the stiffness of the laminated glass 24 can be efficiently enhanced.

Additionally, by forming the second region 12 along only one edge of the peripheral edge of the laminated glass 24 in this manner, the intermediate film 13 for the laminated glass can be easily produced, compared to a case where the second region 12 is formed in a frame shape so as to surround the whole circumference of the laminated glass 24.

Figure 6:
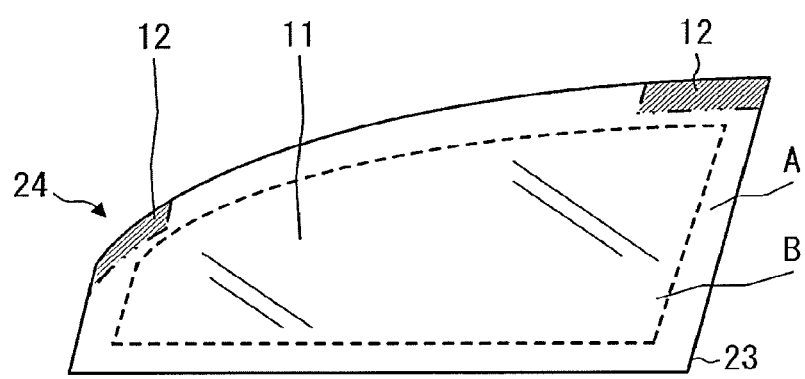
FIG. 6 is a plan view of a fourth modified example of the structure of the second region 12.

Furthermore, the second region 12 may be formed only at a portion along the upper edge of the laminated glass 24. FIG. 6 is a plan view of a fourth modified example of the configuration of the second region 12, which indicates an example where the second region 12 is formed at a part of one edge of the laminated glass 24. In FIG. 6, the second region 12 is formed at two portions, which are both end portions of the upper edge of the laminated glass 24. Since both the end portions of the upper edge of the laminated glass 24 are portions such that, when the laminated glass 24 is moved upward or downward so that the window is half opened, and when traveling at high speed, the highest shearing stress is generated in the intermediate film 13 for the laminate glass, by forming the second region at these portions, the stiffness of the laminated glass 24 can be more efficiently enhanced.

Further, in FIG. 6, at least a part of the second region 12 is preferably formed at both end portions or one end portion of an edge of the laminated glass 24. The end portion represents the vicinity of an intersection point where one edge and another edge of the laminated glass 24 intersect; and the end portion represents, for example, a region with a radius of 50 mm from an intersection point.

Figure 7:
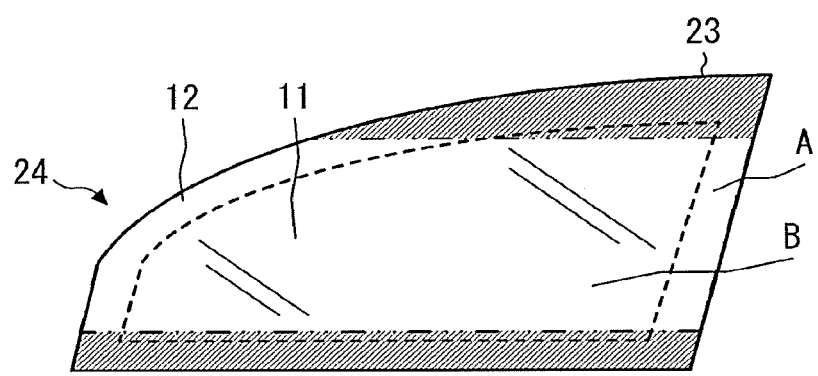
FIG. 7 is a plan view of a fifth modified example of the structure of the second region 12.

Note that, in the modified examples of FIG. 5 and FIG. 6, the second region 12 is formed along the upper edge of the laminated glass 24; however, the arrangement of the second region 12 is not limited to the arrangements of these modified examples. The second region 12 may be formed along any edge of the laminated glass 24; and the second region 12 may be formed along two or more edges. For example, the second region 12 may be formed along each of the two edges that face each other, as illustrated in FIG. 7. FIG. 7 is a plan view of a fifth modified example of the configuration of the second region 12, which indicates an example where the second region 12 is formed along two edges of the laminated glass 24.

Note that, in the embodiment, "along the edge" may not require to contact the edge of the laminated glass 24, and it may formed at a position that is separated from the edge by a predetermined interval. Further, as illustrated in FIG. 7, the second region 12 may not be parallel to the edge of the laminated glass 24.

Figure 8:
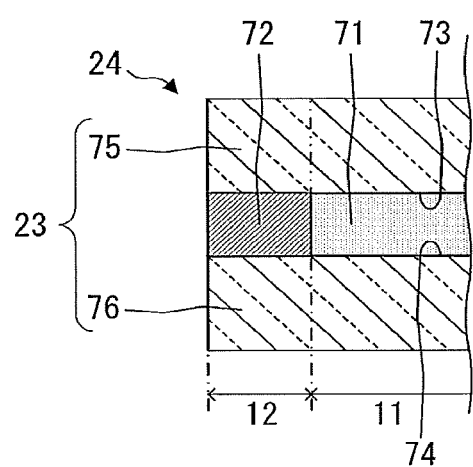
FIG. 8 is a cross-sectional view illustrating a C-C cross section.

Furthermore, FIG. 8 is a cross-sectional view illustrating a cross section along C-C of the embodiment. FIG. 8 illustrates the cross section along C-C of the laminated glass 24 in FIG. 2. The laminated glass 24 has a configuration such that a first glass plate 75 and a second glass plate 76 face each other, and the first glass plate 75 and the second glass plate 76 are adhered through the intermediate film 13 for the laminated glass. The intermediate film 13 for the laminated glass includes a first member 71 and a second member 72; and the intermediate film 13 for the laminated glass has a first surface 73 that contacts the first glass plate 75, and a second surface 74 that contacts the second glass plate 76.

In the cross-sectional view, as illustrated in FIG. 8, the first region 11 and the second region 12 in the plan view are represented by ranges that are partitioned by the two-dot chain line in FIG. 8; and they include all different members in the thickness direction. Namely, the first region 11 represents a region at an inner side of the surface compared to the two-dot chain line; and the second region 12 represents a region at a side of the periphery compared to the two-dot chain line.

Next, the shear modulus of the first region 11 and the second region 12 is described for the laminated glass 24, such as that of illustrated in FIG. 8.

As described above, the first region 11 includes all the different members in the thickness direction; namely, the first and second glass plates 75 and 76, and the first member 71 are included, which are laminated. The shear modulus is a physical property representing resistance against deformation, upon shear force is applied to an object; and the shear modulus of the first member 71 that forms the intermediate film 13 for the laminated glass is significantly low, compared to the shear modulus of the first and second glass plates 75 and 76. In this case, it can be considered that the shear modulus of the first region 11 in which the first and second glass plates 75 and 76, and the first member 71 are laminated is the shear modulus of the first member 71, which is the portion where the shear modulus is the lowest.

Similarly, in the second region 12, the glass plates 75 and 76, and the second member 72 are laminated. For a case where the shear modulus of the second member 72 is significantly low, compared to the shear modulus of the first and second glass plates 75 and 76, it can be considered that the shear modulus of the second region 12 is the shear modulus of the second member 72.

Namely, the shear modulus of the first region 11 and the second region 12 represents the shear modulus of all the members in the thickness direction, excluding the first glass plate 75 and the second glass plate 76.

For the case of the embodiment of FIG. 8, the shear modulus of the first region 11 and the second region 12 depends on the first member 71 and the second member 72.

Figure 9:
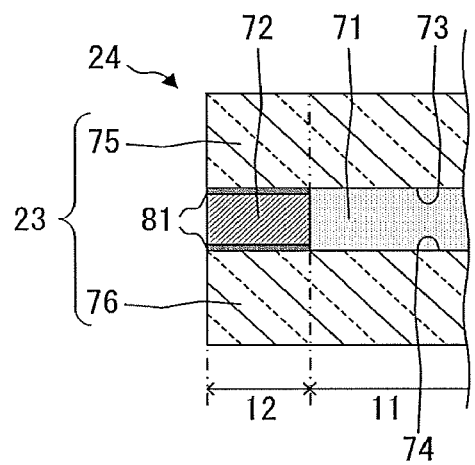
FIG. 9 is a cross-sectional view illustrating a first modified example of the C-C cross section.

In FIG. 8, the second member 72 forms both surfaces, which are the first surface 73 and the second surface 74; and the second member 72 continuously forms the surfaces from the first surface 73 to the second surface 74. Note that, when adhesiveness between the second member 72 and the glass is insufficient, an adhesive (which is also referred to as the "adhesive layer," hereinafter) 81 may be applied to the first surface 73 and the second surface 74 of the second member 72, so that the second member 72 can contact the first glass plate 75 and the second glass plate 76 through the adhesive layer 81. FIG. 9 is a cross-sectional view illustrating a first modified example of the cross section along C-C; and FIG. 9 illustrates a state where the second member 72 is bonded to the first and second glass plates 75 and 76 through the adhesive layer 81. Note that, in FIG. 9, the adhesive layer is illustrated to be thick, and it does not represent the accurate scale.

Additionally, for the case of FIG. 9, it is desirable that the adhesive layer 81 has shear modulus that is higher than or equal to that of the second member 72. Further, when the shear modulus of the adhesive layer 81 is lower than the shear modulus of the second member 72, it is desirable that the thickness of the adhesive layer 81 is sufficiently small.

Figure 10:
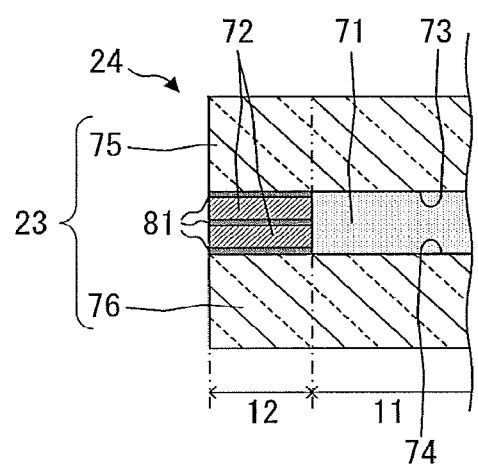
FIG. 10 is a cross-sectional view illustrating a second modified example of the C-C cross section.

Furthermore, as illustrated in FIG. 10, it can be configured such that a plurality of second members 72 is laminated through the adhesive layer 81. FIG. 10 is a cross-sectional view illustrating a second modified example of the cross section along C-C, which illustrates a state where the plurality of second members 72 is laminated through the adhesive layer 81.

Note that, for a case where the adhesive layer 81 is provided, such as the modified examples of FIG. 9 and FIG. 10, the second region 12 is deemed to be a laminated body of the adhesive layer 81 and the second member 72, and a value that is calculated in accordance with the rule of mixtures of shear modulus for the laminated body is the shear modulus of the second region 12.

EXAMPLES

In the following, results are described, which are the results of calculating the sound insulating property and the stiffness of the laminated glass 24 using the intermediate film 13 for the laminated glass according to the embodiment of the present invention.

The thickness of each of the first and second glass plates 75 and 76 (>0) is preferably less than or equal to 2.5 mm. In the examples, the thickness of each of the first and second glass plates 75 and 76 was 2.3 mm, and the thickness of the intermediate film 13 for the laminated glass was 0.76 mm. Additionally, the shear modulus of the first region 11 was equivalent to that of the sound insulating intermediate film.

Example 1

Figure 11:
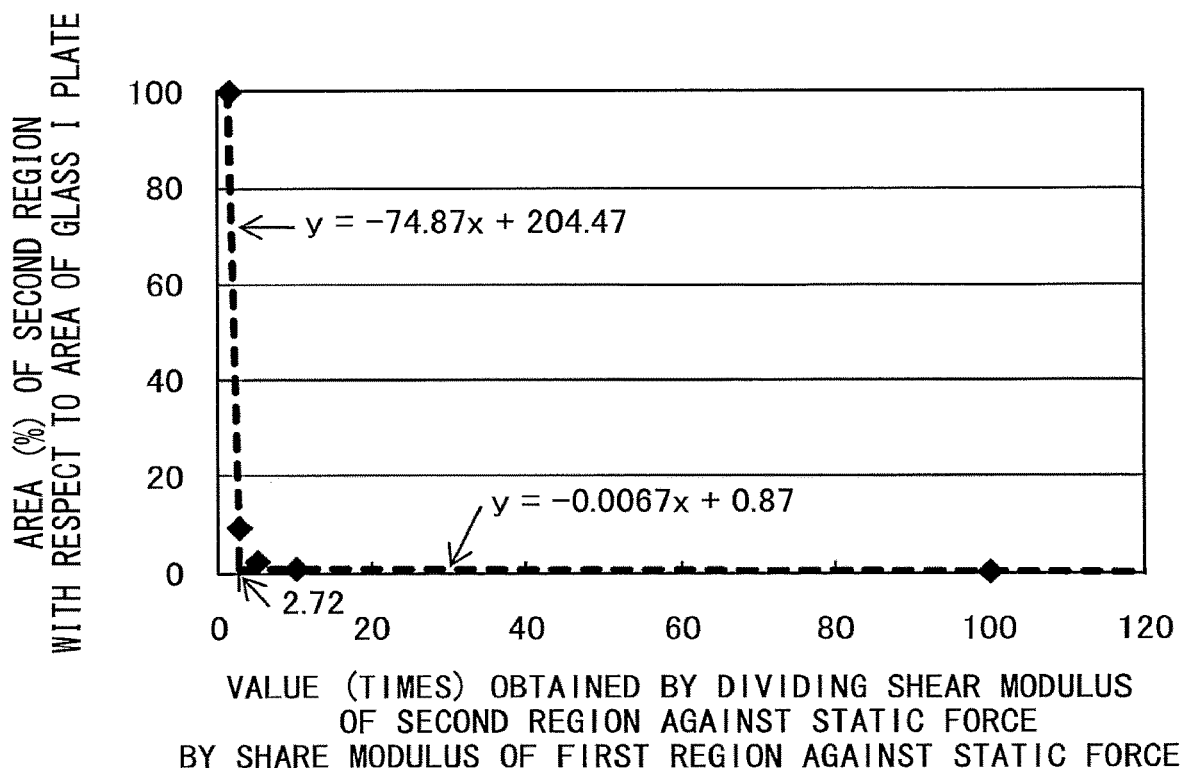
FIG. 11 is a diagram illustrating, for the laminated glass 24 where stiffness is approximately 1.1 times stiffness of a laminated glass plate in which a whole area of the intermediate film 13 for the laminated glass has shear modulus of a first region 11, a relationship between an area of the second region 12 with respect to an area of glass plates 75 and 76 and a value obtained by dividing shear modulus of the second region 12 against static force by the shear modulus of the first region 11 against the static force.

FIG. 11 is a diagram illustrating, for the laminated glass 24 where stiffness is approximately 1.1 times the stiffness of a laminated glass plate in which a whole area of the intermediate film 13 for the laminated glass has the shear modulus of the first region 11, a relationship between an area of the second region 12 with respect to an area of the glass plates 75 and 76 and a value obtained by dividing shear modulus of the second region 12 against static force by the shear modulus of the first region 11 against the static force. In FIG. 11, the lateral axis (x) represents a value obtained by dividing the shear modulus of the second region 12 against the static force by the shear modulus of the first region against the static force (unit: times); the vertical axis (y) represents the area of the second region 12 with respect to the area of the glass plates 75 and 76 (unit: %); and each of the plots and the line represents values with which the laminated glass 24 exhibits sufficient stiffness. Here, the values for exhibiting the sufficient stiffness are, for example, values with which the stiffness of the laminated glass 24 is approximately 1.1 times, compared to that of the case where the laminated glass is produced, in which the whole area of the intermediate film 13 for the laminated glass has the shear modulus of the first region 11.

From FIG. 11, it can be seen that, when a value obtained by dividing the shear modulus of the second region against the static force by the shear modulus of the first region against the static force is denoted by x, if the area y of the second region 12 with respect to the area of the glass plates 75 and 76 is in a range that is greater than or equal to $(-74.87x+204.47)$%, for $1.40 \leq x \leq 2.72$; and greater than or equal to $(-0.0067x+0.87)$%, for $x>2.72$, the laminated glass 24 that exhibits the sufficient stiffness can be obtained.

Figure 12:
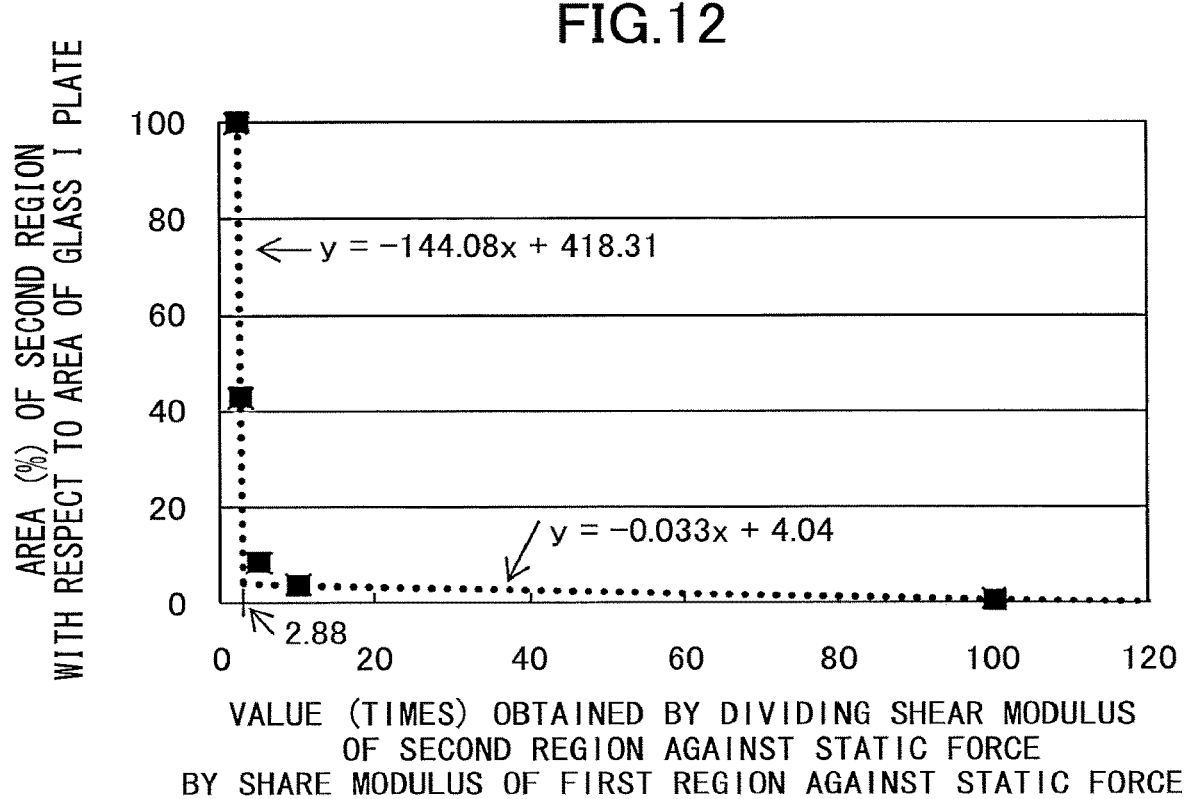
FIG. 12 is a diagram illustrating, for the laminated glass 24 where stiffness is approximately 1.3 times the stiffness of the laminated glass plate in which the whole area of the intermediate film 13 for the laminated glass has the shear modulus of the first region 11, a relationship between the area of the second region 12 with respect to the area of glass plates 75 and 76 and the value obtained by dividing the shear modulus of the second region 12 against static force by the shear modulus of the first region 11 against the static force.

Further, FIG. 12 is a diagram illustrating, for the laminated glass 24 where the stiffness is approximately 1.3 times the stiffness of the laminated glass plate in which the whole area of the intermediate film 13 for the laminated glass has the shear modulus of the first region 11, a relationship between the area of the second region 12 with respect to the area of glass plates 75 and 76 and the value obtained by dividing the shear modulus of the second region 12 against static force by the shear modulus of the first region 11 against the static force. FIG. 12 is also represented by the vertical axis and the lateral axis that are the same as those of FIG. 11, and each of the plots and the line represents values with which the laminated glass 24 exhibits sufficient stiffness. Here, the values for exhibiting the sufficient stiffness is, for example, values with which the laminated glass 24 that is formed of the two glass plates 75 and 76, each of which has the thickness of 2.3 mm, and the sound insulating intermediate film having the thickness of 0.76 mm has the stiffness that is equivalent to that of the laminated glass formed of two glass plates, each of which has the thickness of 2.5 mm, and the sound insulating intermediate film; and which are the values with which the stiffness of the laminated glass 24 is approximately 1.3 times, compared to a case where the laminated glass is produced in which the whole area of the intermediate film 13 for the laminated glass has the shear modulus of the first region 11.

From FIG. 12, it can be seen that, when a value obtained by dividing the shear modulus of the second region against the static force by the shear modulus of the first region against the static force is denoted by x, if the area y of the second region 12 with respect to the area of the glass plates 75 and 76 is in a range that is greater than or equal to $(-144.08x+418.31)$%, for $2.21 \leq x \leq 2.88$; and greater than or equal to $(-0.033x+4.04)$%, for $x>2.88$, the laminated glass 24 that exhibits more sufficient stiffness can be obtained.

Example 2

Figure 13:
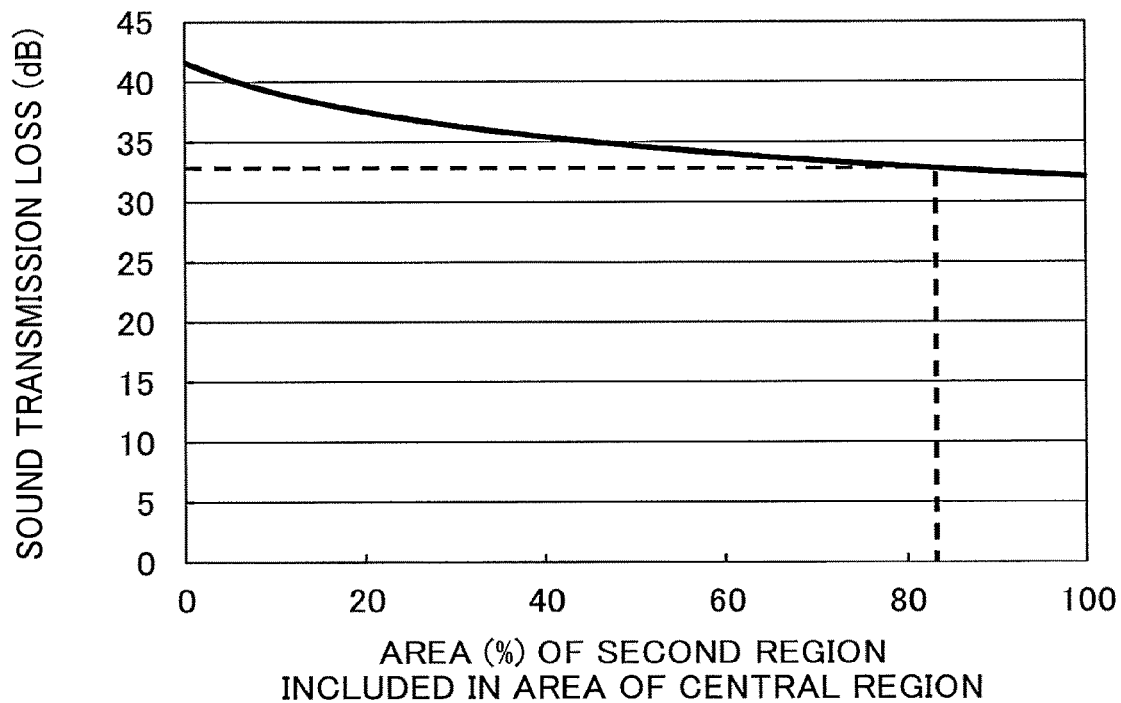
FIG. 13 is a diagram illustrating, for a case where loss factors of the first region 11 and the second region 12 are the same, a relationship between sound transmission loss and an area of the second region 12 included in a central region B.

FIG. 13 is a diagram illustrating, for a case where loss factors of the first region 11 and the second region 12 are the same, a relationship between sound transmission loss and an area of the second region 12 included in the central region B. In FIG. 13, the lateral axis represents the area of the second region 12 with respect to the area of the central region B (unit: %); and the vertical axis represents the sound transmission loss (unit: dB). For the sound transmission loss, the value for 3150 Hz is indicated, as representative value.

Additionally, the value of the sound transmission loss for the normal intermediate film is 32.8 dB.

Here, calculation was performed, while assuming that the second region 12 had the shear modulus against the static force that was approximately 100 times compared to that of the first region 11, and had the shear modulus against sound waves from 2 kHz to 8 kHz that was approximately from 2 times to 7 times compared to that of the first region 11; and that loss factors of the first region 11 and the second region 12 during transmission of the sound waves were the same.

From FIG. 13, it can be seen that, as the area of the second region 12 with respect to the central region B increases, the sound transmission loss decreases, namely, the sound insulating property is lowered. Since, for the normal intermediate film, the sound transmission loss for 3150 Hz is 32.8 dB, it is desirable that the area of the second region 12 with respect to the area of the central region B is less than or equal to 83%, so that the intermediate film 13 for the laminated glass has the sound insulating property. Additionally, it is desirable that the area of the second region 12 with respect to the area of the central region B is preferably less than or equal to 50%, more preferably less than or equal to 31%, so that the more higher sound insulating property can be obtained.

Figure 14:
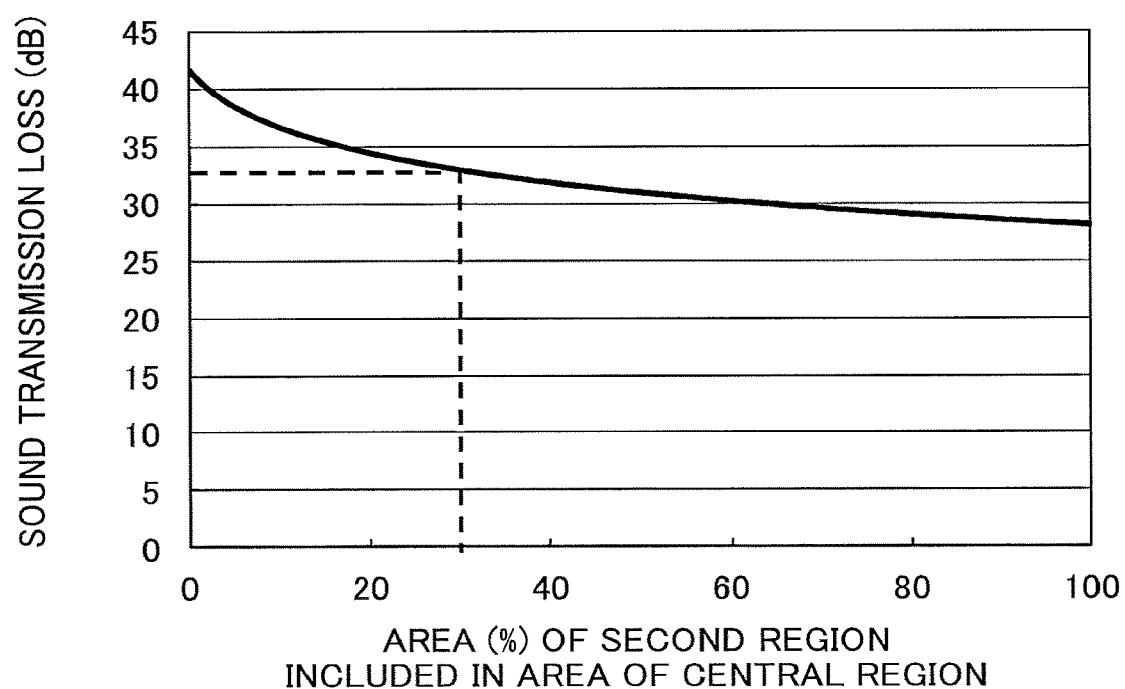
FIG. 14 is a diagram illustrating, for a case where the loss factor of the first region 11 is approximately 15 times the loss factor of the second region 12, a relationship between the sound transmission loss and the area of the second region 12 included in the central region B.

Further, FIG. 14 is a diagram illustrating, for a case where the loss factor of the first region 11 is approximately 15 times the loss factor of the second region 12, a relationship between the sound transmission loss and the area of the second region 12 included in the central region B. FIG. 14 is represented by the vertical axis and the lateral axis that are the same as those of FIG. 13, and it is a result of performing calculation, while assuming that the second region 12 had the shear modulus against the static force that was approximately 100 times compared to that of the first region 11, and had the shear modulus against sound waves from 2 kHz to 8 kHz that was approximately from 2 times to 7 times compared to that of the first region 11; and that loss factors of the first region 11 during transmission of the sound waves was approximately 15 times that of the second region 12.

For such a case, it is more desirable, from FIG. 14, that the area of the second region 12 with respect to the area of the central region B is less than or equal to 31%, so that the intermediate film 13 for the laminated glass has the sound insulating property. Additionally, it is desirable that the area of the second region 12 with respect to the area of the central region B is preferably less than or equal to 20%, more preferably less than or equal to 10%, so that the more higher sound insulating property can be obtained.

According to the above-described embodiment, modified examples, and examples, the laminated substrate for the window, the laminated substrate for the window with the frame body, the automobile with the laminated substrate for the window, and the intermediate layer structure for the laminated substrate for the window that is suitable for producing the laminated substrate for the window can be provided, with which a sufficient sound insulating property is obtained, and sufficient stiffness is obtained. Especially, since a laminated glass suitable for a sliding window for, for example, a vehicle can be provided, the present invention can be utilized for the laminated glass for a vehicle, and further can be utilized, for example, for the window glass for a building.

Figure 15:
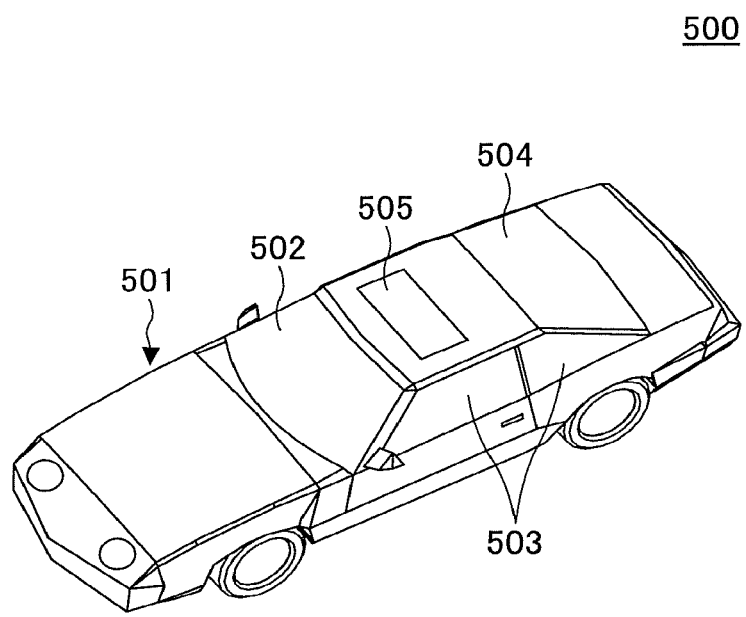
FIG. 15 is a perspective view illustrating an example of an automobile.

FIG. 15 is a perspective view illustrating an example of the automobile. The automobile 500 illustrated in FIG. 15 includes the vehicle body 501. The vehicle body 501 is provided with the windshield 502; a side glass 503; a rear glass 504; and a roof glass 505. The side glass 503 is an example of the lifting window that goes up and down in the vertical direction. Each of the windshield 502, the side glass 503, the rear glass 504, and the roof glass 505 can be formed of a laminated glass, such as that of described above.

The laminated substrate for the window, the laminated substrate for the window with the frame body, the automobile with the laminated substrate for the window, and the intermediate layer structure for the laminated substrate for the window are described above by the embodiment and the examples; however, the present invention is not limited to the above-described embodiment and examples. Various modifications and improvements can be made within the scope of the present invention, such as combination with a part or all of other embodiments and examples, or substitutions.

The invention claimed is:

1. A laminated substrate for a window, a plurality of substrates being laminated through an intermediate layer structure in the laminated substrate, the laminated substrate for the window comprising, in a plan view:
    a peripheral edge region along a periphery of the laminated substrate for the window; and
    a central region positioned inside the peripheral edge region,
    wherein the intermediate layer structure includes, in the plan view, a first region, and a second region,
    wherein shear modulus of the second region against static force is greater than or equal to 1.40 times that of the first region, wherein static force represents external force with a frequency that is less than or equal to 1 Hz, where a loading time is greater than or equal to 1 second,
    wherein, when a value obtained by dividing the shear modulus of the second region against the static force by shear modulus of the first region against the static force is denoted by x, in the second region, a ratio of an area of the second region with respect to an area of the whole laminated substrate for the window in the plan view is greater than or equal to (−74.87x+204.47)%, for 1.40≤x≤2.72; and greater than or equal to (−0.0067x+0.87)%, for x≥2.72,
    wherein a ratio of an area of the second region included in the central region in the plan view is greater than or equal to 0% and less than or equal to 83%,
    wherein the plurality of substrates are glass plates, and the laminated substrate for the window is a laminated glass,
    wherein the first region includes a first member directly in contact with each of the glass plates, wherein the first member is a single layer, and the second region includes a second member in between each of the glass plates,
    wherein a thickness of each of the glass plates is less than or equal to 2.5 mm, and
    wherein a peripheral edge portion is supported by a frame body which is a vehicle body, and the peripheral edge region overlaps with the vehicle body in the plan view when the laminated substrate for the window is attached to a vehicle.

2. The laminated substrate for the window according to claim 1, wherein the shear modulus of the second region against the static force is greater than or equal to 2.21 times that of the first region,
    wherein, when the value obtained by dividing the shear modulus of the second region against the static force by the shear modulus of the first region against the static force is denoted by x, in the second region, the ratio of the area of the second region with respect to the area of the whole laminated substrate for the window in the plan view is greater than or equal to (−144.08x+418.31)%, for 2.21≤x≤2.88; and greater than or equal to (−0.033x+4.04)%, for x>2.88; and wherein, the ratio of the area of the second region included in the central region in the plan view is greater than or equal to 0% and less than or equal to 83%.

3. The laminated substrate for the window according to claim 1, wherein the ratio of the area of the second region included in the central region in the plan view is greater than or equal to 0% and less than or equal to 31%.

4. The laminated substrate for the window according to claim 1, wherein, for a frequency that is greater than or equal to 2 kHz and less than or equal to 8 kHz, in the first region, the shear modulus is less than or equal to 100 MPa.

5. The laminated substrate for the window according to claim 1, wherein the second region is formed, at least, along one part of one edge of the laminated substrate for the window.

6. The laminated substrate for the window according to claim 1, wherein the second region is formed, at least, at both end portions of one edge of the laminated substrate for the window.

7. The laminated substrate for the window according to claim 1, wherein the second region is formed, at least, along one edge of the laminated substrate for the window.

8. The laminated substrate for the window according to claim 1, wherein the second region is formed along two edges of the laminated substrate for the window, the two edges facing each other.

9. The laminated substrate for the window according to claim 1, wherein the second region is formed, at least, at the peripheral edge region.

10. The laminated substrate for the window according to claim 1, wherein the second region is at a region within 120 mm from the edge portion of the glass plate.

11. An automobile comprising:
a window substrate for an opening of a vehicle,
wherein the window substrate is formed of a laminated substrate for a window, a plurality of substrates being laminated through an intermediate layer structure in the laminated substrate,
wherein the laminated substrate for the window includes, in a plan view, a peripheral edge region along a periphery of the laminated substrate for the window; and a central region positioned inside the peripheral edge region,
wherein the intermediate layer structure includes, in the plan view, a first region, and a second region,
wherein shear modulus of the second region against static force is greater than or equal to 1.40 times that of the first region, wherein static force represents external force with a frequency that is less than or equal to 1 Hz, where a loading time is greater than or equal to 1 second,
wherein, when a value obtained by dividing the shear modulus of the second region against the static force by shear modulus of the first region against the static force is denoted by x, in the second region, a ratio of an area of the second region with respect to an area of the whole laminated substrate for the window in the plan view is greater than or equal to (−74.87x+204.47)%, for 1.40≤x≤2.72; and greater than or equal to (−0.0067x+0.87)%, for x>2.72,
wherein a ratio of an area of the second region included in the central region in the plan view is greater than or equal to 0% and less than or equal to 83%,
wherein the plurality of substrates are glass plates, and the laminated substrate for the window is a laminated glass,
wherein the first region includes a first member directly in contact with each of the glass plates, wherein the first member is a single layer, and the second region includes a second member in between each of the glass plates,
wherein a thickness of each of the glass plates is less than or equal to 2.5 mm, and
wherein a peripheral edge portion is supported by a frame body which is a vehicle body, and the peripheral edge region overlaps with the vehicle body in the plan view when the laminated substrate for the window is attached to a vehicle.

12. The laminated substrate for the window according to claim 1, wherein the second region is placed inside the peripheral edge region.

13. The laminated substrate for the window according to claim 1, wherein the second region exists only at the upper edge of the laminated substrate for the window.

14. The laminated substrate for the window according to claim 1, wherein the second region is formed only at both end portions of the upper edge of the laminated substrate for the window, or the second region is formed only at one end portion of the upper edge of the laminate substrate for the window.

15. The laminated substrate according to claim 1, wherein the second region comprises a plurality of the second members laminated through a plurality of adhesive layers, wherein the adhesive layers are in direct contact with each of the glass plates.

* * * * *